United States Patent [19]

Smith et al.

[11] 4,056,005

[45] Nov. 1, 1977

[54] BLOCKED ISOCYANATE COMPOSITION FOR FORMING THERMOPARTICULATING COATING

[75] Inventors: James D. B. Smith, Turtle Creek; Joseph F. Meier, Export; David C. Phillips, Pittsburgh, all of Pa.

[73] Assignee: Westinghouse Electric Corporation, Pittsburgh, Pa.

[21] Appl. No.: 568,222

[22] Filed: Apr. 15, 1975

[51] Int. Cl.² .................. G01K 11/02; C09K 3/00
[52] U.S. Cl. .......................... 73/339 R; 252/408
[58] Field of Search ............ 73/339 R, 349; 260/77.5 TB; 310/55, 56, 52; 252/408

[56] References Cited

U.S. PATENT DOCUMENTS

| | | | |
|---|---|---|---|
| 2,886,555 | 5/1959 | Bunge et al. | 260/77.5 TB X |
| 3,080,368 | 3/1963 | Wegler et al. | 260/77.5 TB X |
| 3,427,880 | 2/1969 | Grobel et al. | 73/339 R |
| 3,807,218 | 4/1974 | Carson et al. | 73/421.5 R X |

OTHER PUBLICATIONS

Saunders, J. H. et al., "Polyurethanes:Chemistry and Technology, I. Chemistry,"; Interscience Publishers, 1962, pp. 118–121.

*Primary Examiner*—Jerry W. Myracle
*Assistant Examiner*—John S. Appleman
*Attorney, Agent, or Firm*—R. D. Fuerle

[57] ABSTRACT

A composition is disclosed of a blocked isocyanate, a resinous carrier, and a solvent. The composition is applied to a portion of an electrical apparatus which is exposed to a gas stream. The solvent in the composition is evaporated to produce a thermoparticulating coating. When the electrical apparatus overheats the blocked isocyanate in the coating forms particles in the gas stream which are detected by a monitor.

53 Claims, No Drawings

BLOCKED ISOCYANATE COMPOSITION FOR FORMING THERMOPARTICULATING COATING

CROSS-REFERENCES TO RELATED APPLICATIONS

This application is related to application Ser. No. 426,391 filed Dec. 19, 1973 by Emil M. Fort, Thomas D. Karzmarek, and David Colin Phillips titled "Sampling System for Power Generators."

This application is also related to application Ser. No. 568,221, filed of even date, by J. D. B. Smith and D. C. Phillips titled "Metal Acetyl Acetonate Composition For Forming Thermoparticulating Coating."

This application is related to application Ser. No. 568,219 filed of even date by J. D. B. Smith and D. C. Phillips titled "Malonic Acid Derivative Composition For Forming Thermoparticulating Coating."

This application is related to application Ser. No. 568,224 filed of even date by J. D. B. Smith and D. C. Phillips titled "Diazonium Salt Composition For Forming Thermoparticulating Coating."

This application is related to application Ser. No. 568,223 filed of even date by J. D. B. Smith and D. C. Phillips and K. W. Grossett titled "Grease Thermoparticulating Coating."

This application is related to application Ser. No. 568,218 filed of even date by D. C. Phillips, W. M. Hickam, and J. D. B. Smith titled "Multiple Signal Thermoparticulating Coating."

PRIOR ART

A book titled "Polyurethanes: Chemistry and Technology, I. Chemistry" by J. H. Saunders and K. C. Frisch, Interscience Publishers, 1962, on pages 118 and 121 describes the formation, splitting, and decomposition products of blocked isocyanates.

U.S. Pat. No. 3,705,119 describes the splitting of blocked isocyanates.

BACKGROUND OF THE INVENTION

Electrical apparatus, such as motors and turbine generators, occasionally overheat due to shorts or other malfunctions. The longer the overheating continues the more damage is done to the apparatus. A malfunction detected immediately may mean only a quick repair but if the overheating continues, the entire machine may be damaged.

Large rotational electrical apparatus is usually cooled with a hydrogen gas stream. The organic compounds in the apparatus are first to be affected by the overheating and they decompose to form particles which enter the gas stream. Monitors then detect particles in the gas stream and sound a warning or shut down the apparatus when too many particles are detected.

Descriptions of such monitors and how they function may be found in U.S. Pat. No. 3,427,880 titled "Overheating Detector For Gas Cooled Electrical Machine" and in U.S. Pat. No. 3,573,460 titled "Ion Chamber For Submicron Particles." Another monitor, "The Condensation Nuclei Detector," is described by F. W. Van-Luik, Jr. and R. E. Rippere, in an article titled "Condensation Nuclei, A New Technique For Gas Analysis," in Analytical Chemistry 34, 1617 (1962) and by G. F. Skala, in an article titled "A New Instrument For The Continuous Detection of Condensation Nuclei," in Analytical Chemistry 35, 702 (1963).

As U.S. Pat. Nos. 3,427,880 and 3,807,218 suggest, special coatings may be applied to the apparatus which decompose to form detectable particles at a lower temperature than the usual organic compounds found in the apparatus. For example, that patent mentions polyalphamethylstyrene, polystyrene, polymethyl methacrylate, and cellulose propionate which decompose to form particles at 230° to 340° C. Unfortunately, since these machines normally operate at about 50° to 100° C, they may be severely damaged by the time the temperature reaches 230° to 340° C.

Efforts to identify materials which will decompose to form detectable particles (i.e., thermoparticulate) at temperatures closer to the operating temperature of the machine have met with several difficulties. Many compounds, such as succinic acid, maleic acid, fumaric acid, and polyacrylic acid, do not decompose below 190° C. Others such as acetic acid, are liquids which boil and therefore are unsuitable. Some compounds, such as oxalic acid, decompose at a low temperature but the decomposition products to not include detectable particles. Compounds such as 1, 2-diformylhydrazine have some of the desirable properties but cannot withstand several years operation at 60° to 100° C. A few compounds contain toxic or corrosive substances in their decomposition products which may render them unsuitable.

SUMMARY OF THE INVENTION

We have found that blocked isocyanates can be used in a composition to form a thermoparticulating coating which produces detectable particles. The coating can be made compatible with the other organic compounds in the apparatus. The coating is very stable and can withstand several years operation at 60° C without decomposing, yet still produce detectable particles when the temperature reaches about 125° to 180° C (depending on the particular blocked isocyanate used). Also, when the coating is heated to about the thermoparticulating temperature of the coating it blisters and becomes a very dark brown color which is a considerable aid in locating the malfunction.

DESCRIPTION OF THE INVENTION

A composition is prepared of a blocked isocyanate in a solution of a resinous carrier. The blocked isocyanate may be dispersed if it is insoluble in the solvent (e.g., toluene) or it may be in solution if it is soluble in the solvent (e.g., ethyl alcohol or diethyl ether). Dispersions are preferred as they produce much more particulation than do solutions. A particle size of the dispersed blocked isocyanate of about 25 to about 1000 microns is suitable.

The composition also preferably contains about 0.1 to about 3 phr of a drier when the resinous carrier is an epoxy resin or similar resin, to promote its room temperature cure. Lead naphthenate or cobalt naphthenate is preferred although stannous octoate, zinc stearate, etc. could also be used. Resins such as polyesters may also require the presence of an organic peroxide as is known in the art. Mixtures of various resins, solvents, or driers are also contemplated.

The composition may be prepared by simply mixing the ingredients, but it is preferable to mix the drier, resinous carrier, and solvent first and then add the blocked isocyanate to prevent the occlusion of the drier in the blocked isocyanate and thereby to obtain a more homogeneous dispersion of the blocked isocyanate.

A suitable composition is a resinous carrier, about 20 to about 250 phr (parts by weight per hundred parts of resinous carrier not including solvent) of a blocked isocyanate, and about 25 to about 75% (by weight based on the resinous carrier) of a solvent for the resinous carrier. If the amount of blocked isocyanate is less than about 20 phr, the quantity of particles given off during decomposition may be too low to be detected by presently-existing detectors. However, the construction of more sensitive detectors would permit a lower amount of blocked isocyanate. If the amount of blocked isocyanate exceeds about 250 phr, the composition is thick, difficult to apply, and does not bond well. The preferred amount of blocked isocyanate, which generally gives the best results, is about 40 to about 60 phr. If the amount of solvent is less than about 25%, the composition is generally too viscous to apply easily and if the amount of solvent is greater than about 75%, the composition is unnecessarily dilute and the coating may be too thin to produce an adequate number of particles during decomposition, at least while the malfunction is highly localized. Best results are usually obtained with about 45 to about 55% solvent.

The thermoparticulating compounds of this invention are blocked isocyanates. The blocked isocyanate must decompose between about 60 and about 200° C and produce particles larger than about 25A in order for the particles to be detected with presently-existing monitors. They are preferably solids at 60° C.

Blocked isocyanates may be regarded as the reaction product of an isocyanate and a Lewis base according to the equation

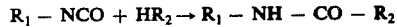

$$R_1 - NCO + HR_2 \rightarrow R_1 - NH - CO - R_2$$

In the above equation $R_1 - NCO$ is any isocyanate including aliphatics, aryls, cycloaliphatics, hetrocyclics, alkylaryls, and isocyanate substitutions of any of these. Also included are isocyanate-terminated pre-polymers such as the isocyanate formed when polyoxymethylene glycol is reacted with a diisocyanate such as toluene diisocyanate or hexamethylene diisocyanate. Specific examples of suitable isocyanates include:
4,4'-diisocyanato diphenyl 2,2-propane
4,4'-diisocyanato diphenyl methane
4,4'-diisocyanate benzidine
4,4'-diisocyanato diphenyl sulfur
4,4'-diisocyanato diphenyl sulfone
4,4'-diisocyanato diphenyl ether
4,4'-diisocyanato diphenyl 1,1-cyclohexane
oxides of methyl-and of bis (meta-isocyanato-phenyl)-phosphine
diisocyanato 1,5-naphthalene
meta-phenylene diisocyanate
toluylene diisocyanate
dimethyl 3,3'-diisocyanato 4,4'-diphenylene
dimethoxy 3,3'-diisocyanato 4,4'-diphenylene
meta-xylylene diisocyanate
para-xylylene diisocyanate
diisocyanato 4,4'-dicyclohexyl methane
hexamethylene diisocyanate
dodeca-methylene diisocyanate
diisocyanato 2,11-dodecane
bis (para-phenylene isocyanate oxadiazole-1,3,4) paraphenylene
bis (para-phenylene isocyanate) oxadiazole-1,3,4
bis (meta-phenylene isocyanate) oxadiazole-1,3,4
bis (meta-phenylene isocyanate) 4-phenyl triazole-1,2,4
bis (4-paraphenylene isocyanate thiazole 2-yl) metaphenylene
(2-phenylene) benzimidazole 5,4'-diisocyanate
(2-phenylene) benzoxazole 5,4'-diisocyanate
(2-phenylene) benzothiazole 6,4'-diisocyanate
bis (2-phenylene isocyanate benzimidazole 6-yl) 2,5-oxadiazole-1,3,4
bis (para-phenylene isocyanate 2-benzimidazole 6-yl)
bis (para-phenylene isocyanate 2-benzoxazole 6-yl)

The preferred isocyanates are phenyl isocyanate, butyl isocyanate, toluene diisocyanate, and hexamethylene diisocyanate because these compounds are readily available and blocked isocyanates can be easily made from them.

In the same equation $HR_2$ is a Lewis base, where "Lewis base" means an electron donor. Oximes, secondary amines, mercaptans, alcohols, esters, carboxyesters, phenols, thiophenols, and glycidyl ethers are suitable types of Lewis bases. Specific examples of suitable Lewis bases include:
dimethylamine
diethylamine
mercaptobenzothiazole
phenol
nitrosophenol
thiophenol
4,4'-thiophenol
4,4'-sulfonyl diphenol
phenol glycidyl ether
butyl glycidyl ether
α-pyrrolidine
1,3-diethylol-5,5-dimethyl hydantoin
styrene oxide
dicyclophentenyl alcohol
dimethyl ketoxime
ethylmethyl ketoxime
diethyl ketoxime
diphenyl ketoxime
N(2-hydroxyethyl) piperazine The preferred Lewis bases are the secondary amines, specifically diethylamine and dimethylamine, and the oximes, preferably ethylmethyl ketoxime and diethyl ketoxime, because they react easily with the isocyanate and give good yields.

The preferred blocked isocyanates are hexamethylene diisocyanate blocked with dimethylamine, toluene diisocyanate blocked with mercaptobenzothiazole, and toluene diisocyanate blocked with diethylamine, because these blocked isocyanates are stable at 80° C on aging, and thermoparticulate at low temperatures with strong signals. Mixtures of blocked isocyanates are also contemplated.

The resinous carrier performs the function of bonding the blocked isocyanate to the apparatus since a coating of blocked isocyanate by itself does not adhere well. The resinous carrier should be compatible with the other resins used in the apparatus and therefore it is usually advantageous to use the same resin used elsewhere. The resinous carrier is curable below 60° C and is preferably air-dryable since it cannot be easily cured in place with heat. Also, it should be stable when cured for several years at 60° C. The resin must be unreactive with the blocked isocyanate for otherwise suitable thermoparticulation will not occur. The blocked isocyanate and the resin form a mixture and the blocked isocyanate does not catalyze the cure of the resin. Epoxy resins are preferred as they are usually used elsewhere in the apparatus, but polyester, silicone rubber, styrene, etc. could also be used.

The solvent for the resinous carrier depends on the particular resinous carrier used. Toluene, xylene, benzene, methyl ethyl ketone, ethyl alcohol, diethyl ether, acetone, cellosolve, etc., are common solvents that may be used. Toluene is preferred as it is inexpensive and dissolves most resins.

The composition is applied to portions of the electrical apparatus which are exposed to the gas stream. The coating formed does not function as insulation and is usually applied on top of insulation, but it can also be applied to conductors. The application may be made by painting, spraying, dipping, grease gun, or other techniques. A suitable coating thickness (after drying) is about 1/16 to about ½ inch. The dispersed particles of blocked isocyanate should not be covered with excessive resinous carrier as that may prevent the decomposition particles from escaping into the gas stream. After evaporation of the solvent and room temperature cure of the resinous carrier, if necessary, the apparatus is ready to be operated.

When thermoparticulation and the resulting alarm occur, a sample of the gas stream can be collected and analyzed. Since different thermoparticulating compounds can be used in different areas of the apparatus and their thermoparticulation products are different, analysis of the sample can pinpoint the location of the overheating.

The following examples further illustrate this invention.

EXAMPLE 1

The following composition was prepared using various blocked isocyanates:

| | Parts by Weight |
|---|---|
| blocked isocyanate | 100 |
| epoxy resin (50% solids in toluene) made from 200 phr (parts by weight) linseed fatty acids, 200 phr styrene, and 300 phr diglycidyl ether of Bisphenol A, sold by Westinghouse Electric Corporation as "B-276" Varnish (See Example I of U.S. Patent 2,909,497 for detailed description) | 100 |
| 6% solution in low boiling hydrocarbons of cobalt naphthenate | |
| 24% solution in line boiling hydrocarbons of lead naphthenate | 0.25 |

The cobalt and lead naphthenate solutions were added to the epoxy resin prior to the addition of the blocked isocyanate.

Samples were prepared by brushing the above composition onto 3 inch by 1 inch aluminum and copper sheets 1/16 to ¼ inches thick. The samples were dried to form coatings about ¼ inches thick, then placed in an oven at 60° or 80° C for various periods to determine if they were stable and would function after aging.

The samples were placed one at a time in a stainless steel boat within a 1 inch stainless steel tube. Hydrogen was passed over the samples at a flow rate of 7 l/min. A phase-controlled temperature regulator and programmer controlled the temperature in the boat. The temperature in the boat was measured by mounting a hot junction chromel-alumel thermocouple within a small hole in the boat. The output of the thermocouple and the detector were monitored on a two-pen potentiostatic recorder. A 5° C/min. heating rate was maintained in each experiment after the insertion of the sample in the boat. The threshold temperature at which considerable particulation occurred was taken from the chart produced by the recorder. The "alarm" temperature at which considerable particulation occurred corresponded to a 50% decrease in the initial ion current of the detector (usually 0.8 to 0.4 mA). The occurrence of particulation was detected using a Generator Condition Monitor or a Condensation Nuclei Monitor. Both instruments are sold by Environment One Corporation.

The following table gives the results:

| BLOCKED ISOCYANATE | | | | |
|---|---|---|---|---|
| Isocyanate Moiety | Lewis Base Moiety | Melting Point (° C) | Aging Conditions | Thermoparticulation Temperature Range (° C) |
| Hexamethylene Diisocyanate | Dimethylamine | 166-170 | 7 days at 60°C | 166-171 |
| | | | 30 days at 80°C | 166-170 |
| Toluene Diisocyanate | Mercaptobenzothiazole | 153-161 | 7 days at 60°C | 161-165 |
| | | | 30 days at 80°C | 164-165 |
| Toleuen Diisocyanate | Diethylamine | 90-95 | 7 days at 60°C | 154-159 |
| | | | 30 days at 80°C | 154-157 |
| Phenyl Isocyanate | 1,3-diethylol-5,5-dimethyl hydantoin(1) | Visious Liquid | 8 days at 60 20 C | 189-195 |
| P,P'-Diphenylmethane Diisocyanate | Nitrosophenol | 179 | 8 days at 60°C | >190°C |
| "Mondur S"(2) | Phenol | 125-130 | 7 days at 60°C | 190-196 |
| "Mondur SH"(3) | Phenol | 161-166 | 7 days at 60°C | >190 |
| Hexamethylene Diisocyanate | α-Pyrrolidone | 94-96 | 7 days at 60°C | >190 |
| Hexamethylene Diisocyanate | Phenol | 128-131 | 42 days at 60°C | 179-189 |
| Toluene Diisocyanate | Phenol | 153-156 | 42 days at 60°C | 170-177 |
| P, P'-Diphenylmethane Diisocyanate | Phenol | 192-194 | 42 days at 60°C | 190-194 |
| Phenyl Isocyanate | Phenyl glycidyl ether | | overnight at 60°C | 167 |
| Phenyl Isocyanate | Styrene oxide | | overnight at 60°C | 172 |
| Phenyl Isocyanate | Butyl glycidyl ether | | overnight at 60°C | 172 |
| Hexamethylene Diisocyanate | Thiophenol | | overnight at 60°C | 143 |

-continued

| BLOCKED ISOCYANATE | | | | |
|---|---|---|---|---|
| Isocyanate Moiety | Lewis Base Moiety | Melting Point (° C) | Aging Conditions | Thermoparticulation Temperature Range (° C) |
| Phenyl Isocyanate | Ethylmethyl ketoxime | | overnight at 60°C | 169-173 |
| Phenyl Isocyanate | N(2-hydroxyethyl) piperazine | | overnight at 60°C | 180-185 (4) |
| Phenyl Isocyanate | Dicyclopentenyl Alcohol | | overnight at 60°C | 168 |
| Butyl Isocyanate | 4,4'-thiophenyl | | overnight at 60°C | 175 |
| Butyl Isocyanate | 4,4'-sulfonyl diphenol | | overnight at 60°C | 181 |

(1) Sold by Glyco Chemicals, Inc. under the trademark "Dantocol DHE"
(2) "Mondur S" is sold by the Mobay Chemical Co. and has the structure

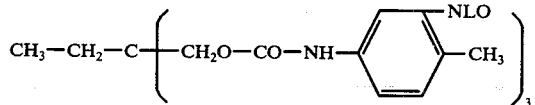

(3) "Mondur SH" is sold by the Mobay Chemical Co. and has the structure

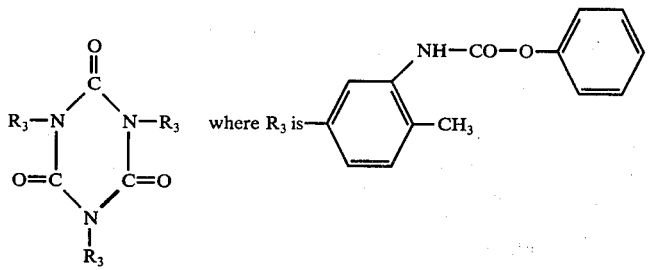  where $R_3$ is 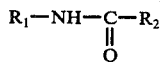

(4) Signal very strong

We claim:

1. A composition comprising at least one blocked isocyanate solution of a resinous carrier curable and stable at 60° C, and unreactive with said blocked isocyanate.

2. A composition according to claim 1 wherein said blocked isocyanate has the general formula:

$$R_1-NH-\underset{\underset{O}{\|}}{C}-R_2$$

and may be regarded as the reaction product of $R_1NCO$ and $HR_2$, where $R_1NCO$ is an isocyanate and $HR_1$ is a Lewis base.

3. A composition according to claim 2 wherein $R_1NCO$ is an isocyanate selected from the group consisting of aliphatics, aryls, cycloaliphatics, heterocyclics, alkylaryls, and isocyanate substitutions thereof.

4. A composition according to claim 3 wherein said isocyanate is selected from the group consisting of phenyl isocyanate, butyl isocyanate, toluene diisocyanate, and hexamethylene isocyanate.

5. A composition according to claim 2 wherein $HR_2$ is a Lewis base selected from the group consisting of oximes, secondary amines, mercaptans, alcohols, esters, carboxyesters,, phenols, thiophenols, and glycidyl ethers.

6. A composition according to claim 5 wherein said Lewis base is selected from the group consisting of oximes and secondary amines.

7. A composition according to claim 6 wherein said oxime is ethylmethyl ketoxime or diethyl ketoxime, and said secondary amine is dimethylamine or diethylamine.

8. A composition according to claim 1 wherein said blocked isocyanate is a solid at 60° C.

9. A composition according to claim 1 wherein the amount of said blocked isocyanate is about 20 to about 250 phr and the amount of the solvent in said solution is about 25 to about 75% (by weight based on said resinous carrier).

10. A composition according to claim 9 wherein the amount of said blocked isocyanate is about 40 to about 60 phr and the amount of said solvent is about 45 to about 55% (by weight based on said resinous carrier).

11. A composition according to claim 1 wherein said resinous carrier is an epoxy resin.

12. A composition according to claim 11 which includes about b 0.1 to about 3 phr of a drier for said epoxy resin.

13. A composition according to claim 12 which is prepared by first mixing said solution of resinous carrier and said drier and then mixing in said blocked isocyanate.

14. A composition according to claim 1 wherein the solvent in said solution is toluene.

15. A composition according to claim 1 wherein said blocked isocyanate is dispersed in said solution.

16. A composition according to claim 1 wherein said resinous carrier is air-dryable.

17. A method of protecting electrical apparatus from damage due to overheating and for thereafter determining the location of said overheating, said apparatus including a gas stream and a monitor for detecting particles in said gas stream and for emitting a signal when said particles are detected comprising:
  A. preparing a composition according to claim 1;
  B. applying said composition to said electrical apparatus at positions exposed to said gas stream; and
  C. evaporating said solvent and curing said resinous carrier.

18. A method according to claim 17 including the additional last step of inspecting said apparatus visually for blistered and darkened areas, after a signal has been emitted, to locate the area of overheating.

19. A method according to claim 17 including the additional last step of collecting a sample of said gas stream after a signal has been emitted, and analyzing said sample.

20. A method according to claim 17 wherein said blocked isocyanate has the general formula:

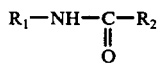

and may be regarded as the reaction product of $R_1NCO$ and $HR_2$, where $R_1NCO$ is an isocyanate and $HR_1$ is a Lewis base.

21. A method according to claim 20 wherein $R_1NCO$ is an isocyanate selected from the group consisting of aliphatics, aryls, cycloaliphatics, heterocyclics, alkylaryls, and isocyanate substitutions thereof.

22. A method according to claim 21 wherein said isocyanate is selected from the group consisting of phenyl isocyanate, butyl isocyanate, toluene diisocyanate, and hexamethylene isocyanate.

23. A method according to claim 20 wherein $HR_2$ is a Lewis base selected from the group consisting of oximes, secondary amines, mercaptans, alcohols, esters, carboxyesters, phenols, thiophenols, and glycidyl ethers.

24. A method according to claim 23 wherein said Lewis base is selected from the group consisting of oximes and second amines.

25. A method according to claim 24 wherein said oxime is ethylmethyl ketoxime or diethyl ketoxime, and said secondary amine is dimethylamine or diethylamine.

26. A method according to claim 17 wherein said blocked isocyanate is a solid at 60° C.

27. A method according to claim 17 wherein the amount of said blocked isocyanate is about 20 to about 250 phr and the amount of the solvent in said solution is about 25 to about 75% (by weight based on said resinous carrier).

28. A method according to claim 17 wherein the amount of said blocked isocyanate is about 40 to about 60 phr and the amount of said solvent is about 45 to about 55% (by weight based on said resinous carrier).

29. A method according to claim 28 wherein said resinous carrier is an epoxy resin.

30. A method according to claim 17 which includes about 0.1 to about 3 phr of a drier for said epoxy resin.

31. A method according to claim 30 which is prepared by first mixing said solution of resinous carrier and said drier and then mixing in said blocked isocyanate.

32. A method according to claim 17 wherein the solvent in said solution is toluene.

33. A method according to claim 17 wherein said blocked isocyanate is dispersed in said solution.

34. A method according to claim 17 wherein said resinous carrier is air-dryable.

35. A thermoparticulating coating comprising a solid layer of a resinous carrier containing a blocked isocyanate, said resinous carrier being solid and stable at 60° C and unreactive with said blocked isocyanate.

36. A coating according to claim 35 which is about 1/16 to about ½ inches thick.

37. A thermal detection system for electrical apparatus cooled by a gas stream, comprising a coating according to claim 35 on a portion of said electrical apparatus exposed to said gas stream and a monitor for detecting the presence of particles in said gas stream.

38. A thermal detection system according to claim 37 wherein said blocked isocyanate has the general formula:

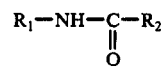

and may be regarded as the reaction product of $R_1NCO$ and $HR_2$, where $R_1NCO$ is an isocyanate and $HR_1$ is a Lewis base.

39. A thermal detection system according to claim 38 wherein $R_1NCO$ is an isocyanate selected from the group consisting of aliphatics, aryls, cycloaliphatics, heterocyclics, alkylaryls, and isocyanate substitutions thereof.

40. A thermal detection system according to claim 39 wherein said isocyanate is selected from the group consisting of phenyl isocyanate, butyl isocyanate, toluene diisocyanate, and hexamethylene isocyanate.

41. A thermal detection system according to claim 38 wherein $HR_2$ is a Lewis base selected from the group consisting of oximes, secondary amines, mercaptans, alcohols, esters, carboxyesters, phenols, thiophenols, and glycidyl ethers.

42. A thermal detection system according to claim 41 wherein said Lewis base is selected from the group consisting of oximes and secondary amines.

43. A thermal detection system according to claim 42 wherein said oxime is ethylmethyl ketoxime or diethyl ketoxime, and said secondary amine is dimethylamine or diethylamine.

44. A thermal detection system according to claim 37 wherein said blocked isocyanate is a solid at 60° C.

45. A thermal detection system according to claim 37 wherein the amount of said blocked isocyanate is about 20 to about 250 phr and the amount of the solvent in said solution is about 25 to about 75% (by weight based on said resinous carrier).

46. A thermal detection system according to claim 45 wherein the amount of said blocked isocyanate is about 40 to about 60 phr and the amount of said solvent is about 45 to about 55% (by weight based on said resinous carrier).

47. A thermal detection system according to claim 37 wherein said resinous carrier is an epoxy resin.

48. A thermal detection system according to claim 47 which includes about 0.1 to about 3 phr of a drier for said epoxy resin.

49. A thermal detection system according to claim 48 which is prepared by first mixing said solution of resinous carrier and said drier and then mixing in said blocked isocyanate.

50. A thermal detection system according to claim 22 wherein the solvent in said solution is toluene.

51. A thermal detection system according to claim 22 wherein said blocked isocyanate is dispersed in said solution.

52. A thermal detection system according to claim 22 wherein said resinous carrier is air-dryable.

53. A compound selected from the group consisting of toluene diisocyanate blocked with mercaptobenzothiazole, phenyl isocyanate blocked with 1,3-diethyl-5,5-dimethyl hydantoin, phenyl isocyanate blocked with ethylmethyl ketoxime, phenyl isocyanate blocked with N(2-hydroxyethyl) piperazine, butyl isocyanate blocked with 4,4'-thiophenol and butyl isocyanate blocked with 4,4'-sulfonyl diphenol.

* * * * *